United States Patent [19]
Zittel

[11] Patent Number: 5,133,249
[45] Date of Patent: Jul. 28, 1992

[54] STEAM AND AIR INJECTION BLANCHER

[75] Inventor: David R. Zittel, Columbus, Wis.

[73] Assignee: Lyco Manufacturing, Inc., Columbus, Wis.

[21] Appl. No.: 811,705

[22] Filed: Dec. 20, 1991

[51] Int. Cl.$^5$ .......... A23L 3/00; A23N 12/00; A47J 37/12

[52] U.S. Cl. .......... 99/348; 99/404; 99/409; 99/516; 99/536; 99/443 C; 99/479; 134/65; 134/132; 366/81; 366/102; 366/107; 366/319

[58] Field of Search .......... 99/348, 404, 409, 450, 99/483, 516, 534, 536, 477–479, 443 C; 366/81, 319, 101, 102, 107, 106; 134/65, 132; 62/381

[56] References Cited

U.S. PATENT DOCUMENTS

| | | | |
|---|---|---|---|
| 1,168,799 | 1/1916 | Grier | 134/65 |
| 1,231,002 | 6/1917 | Dawson | 99/536 |
| 1,674,142 | 1/1928 | Strang | 134/132 |
| 1,806,957 | 5/1931 | Stocking | 134/132 |
| 2,273,528 | 2/1942 | Karp | 134/132 |
| 2,314,871 | 3/1943 | DeBack | 134/65 |
| 2,909,872 | 10/1959 | Kearney et al. | 134/132 |
| 3,684,423 | 8/1972 | Koch et al. | 366/81 |
| 3,722,401 | 3/1973 | Davidson et al. | 99/407 |
| 3,760,714 | 9/1973 | Lortz | 99/404 |
| 3,982,481 | 9/1976 | Console et al. | 99/477 |
| 4,506,598 | 3/1985 | Meister | 99/330 |
| 4,525,370 | 6/1985 | Parkes | 99/536 |
| 4,688,476 | 8/1987 | Zittel | 99/403 |
| 4,875,344 | 10/1989 | Zittel | 62/381 |
| 4,942,810 | 7/1990 | Zittel et al. | 99/477 |
| 4,949,629 | 8/1990 | Leary et al. | 99/386 |

FOREIGN PATENT DOCUMENTS

| | | | |
|---|---|---|---|
| 152431 | 6/1904 | Fed. Rep. of Germany | 99/536 |
| 489668 | 1/1930 | Fed. Rep. of Germany | 134/132 |
| 2161446 | 3/1973 | Fed. Rep. of Germany | 134/65 |
| 1144683 | 3/1985 | U.S.S.R. | 99/516 |

Primary Examiner—Timothy F. Simone
Attorney, Agent, or Firm—Lathrop & Clark

[57] ABSTRACT

A stainless steel tank has an inlet for food products such as pasta and a discharge end where the food product is discharged. A perforated cylinder is mounted to rotate within the tank and an auger is positioned within the cylinder to advance food product from the inlet to the discharge of the tank. The auger is fitted with a plurality of lifting baffles to extend radially inwardly from the cylinder between two adjacent flights of the auger to carry food products sidewardly and lift the food product out of water contained within the tank and allow the food product to tumble back into the water. Two manifolds extend into the tank beneath the perforated cylinder and have a plurality of apertures. A controller controls a supply of steam and a supply of pressurized air to selectively introduce steam and compressed air through the manifold apertures into the tank. The combination of steam and compressed air produces highly agitated regions within the tank which advantageously prevent the food products from sticking together.

12 Claims, 3 Drawing Sheets

STEAM AND AIR INJECTION BLANCHER

FIELD OF THE INVENTION

The present invention relates to industrial food processing equipment in general and to blanchers in particular.

BACKGROUND OF THE INVENTION

Steam blanchers are conventionally used in the food processing industry to blanch or cook a continuous throughput of food product such as, for example, pasta.

A typical blancher may employ a rotating perforated drum which is suspended within a tank partially filled with water. As the drum rotates food products are advanced from an inlet to the discharge of the tank via mechanical helical lifts or other means. Steam is injected through a manifold into the bottom of the tank to heat the water and blanch the food product. To make more efficient use of processing space and equipment, it would be desirable to achieve higher throughputs of food product for a blancher of a particular size. However, many food products and pasta in particular are subject to adhesion to one another when they are placed in contact with one another during the blanching process. Thus, if too great a quantity of food product is loaded into a blancher, sticking, tearing, and other damage to the food product may occur. Such damage is highly undesirable when a uniform food product is sought to be produced. The injection of steam into the blancher tank serves to agitate the food product somewhat helps to avoid adhesion of one article to another. However, the steam is introduced into the tank only intermittently. A continuous introduction of steam or increased duration of steam introduction will overheat the food product and result in spoilage.

What is needed is a steam blancher which allows increased throughput of food product while maintaining the integrity and uniformity of each article.

SUMMARY OF THE INVENTION

The blancher of this invention has a tank with an inlet end and discharge end and a perforated cylinder rotatably mounted within the tank so that water contained in the tank will enter the cylinder. The cylinder has an inlet opening near the inlet end of the tank for receiving introduced food product and a discharge opening near the discharge end of the tank where food product which is moved through the cylinder may be discharged therefrom. An auger is positioned substantially within the perforated cylinder to rotate with the cylinder. The auger drives the food product toward the cylinder discharge opening. An axially extending manifold is disposed within the tank beneath the perforated cylinder and has portions defining a plurality of apertures for the escape of gases from the manifold. A supply of steam is connected to the manifold to permit the selective introduction of steam into the tank. A supply of pressurized air is also connected to the manifold to permit the selective introduction of pressurized air into the tank such that the air introduced thereby will impinge upon the food product carried within the cylinder. A plurality of lifting baffles may also be provided. Each lifting baffle extends substantially radially inwardly from the perforated cylinder in between two adjacent flights of the auger, such that when the auger and cylinder rotate, the baffles carry the food products sidewardly and lift the food product upwardly out of the water and then allow the food product to tumble back into the water.

It is an object of the present invention to provide a steam blancher with an increased throughput of food product.

It is also an object of the present invention to provide a steam blancher which preserves the integrity and uniformity of the food product treated therein.

It is an additional object of the present invention to provide a steam blancher which minimizes the sticking together of pasta treated therein.

It is another object of the present invention to provide a steam blancher which provides desirable agitation to a food product carried therein.

It is a further object of the present invention to provide a steam blancher with controllable agitation of food product.

It is yet another object of the present invention to provide a steam blancher with improved throughput which is economically manufactured.

Further objects, features and advantages of the invention will be apparent from the following detailed description when taken in conjunction with the accompanying drawings.

DESCRIPTION OF THE PREFERRED EMBODIMENT

Figure 1:
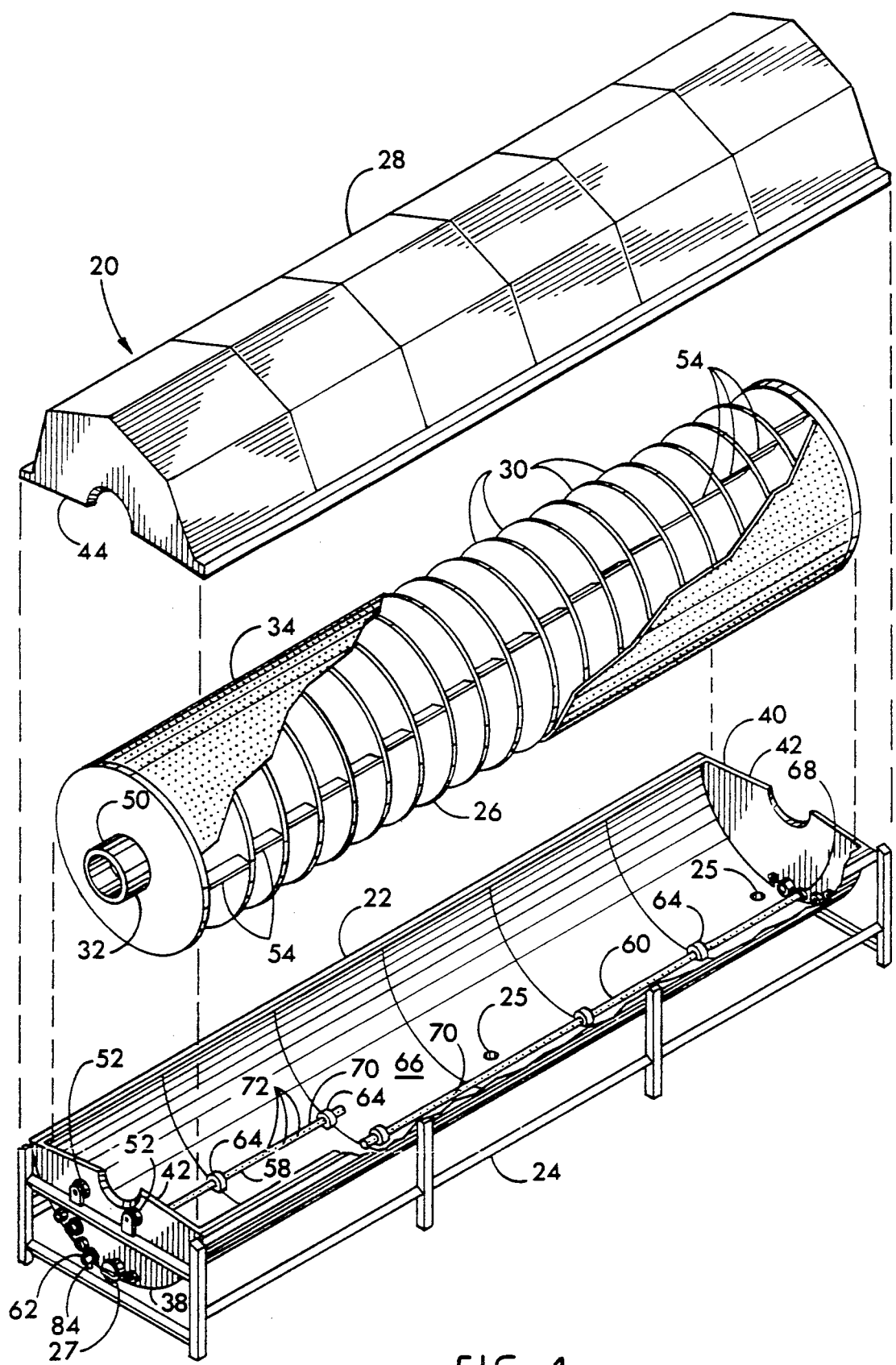
FIG. 1 is an exploded isometric view of the blancher of this invention.

Referring more particularly to FIGS. 1–4 wherein like numbers refer to similar parts, a steam blancher 20 is shown in FIG. 1. The blancher 20 has an elongated open top tank 22 which is supported by a frame 24. A helical auger 26 is longitudinally mounted within the tank 22 and an elongated vaulted cover 28 fits over and covers the tank 22. The tank has a semi-cylindrical wall 66 with three 4" drains located at its lowest portion. Eight inch diameter cleanouts 27 are located in each end of the tank.

The auger 26 is rotatably mounted within the tank 22 and has stainless steel flights 30 wound around a central tube 32. A perforated cylinder 34 encloses the auger 26 and is formed of a plurality of removable screens. The perforated cylinder 34 contains the food product 36 being conveyed by the auger 26. The cylinder 34 and auger 26 are driven by a motor (not shown) at a rate selected to achieve the desired residence of the food product within the blancher 20. As the auger 26 rotates, its flights 30 move the food product 36 being treated from the inlet end 40 to the discharge end 38 of the tank 22. The end walls 42 of the tank and the end walls 44 of the cover 28 form holes 46 through which the tube journals 50 extend. The tube journals also define the inlet and discharge openings of the cylinder 34. The tube journals 50 and the auger 26 itself are supported at both ends of the tank 22 by trunions 52 which are mounted to the frame 24 to support the journals 50 in a conventional manner such that the journals 50 do not make contact with the walls 42, 44 of the tank 22 or cover 28. The vaulted cover 28 may be hingedly attached to the tank 22 so that it may be opened from either side of the blancher as in the manner disclosed in U.S. Pat. No. 4,788,476 to Zittel, the disclosure of which is hereby incorporated herein by reference, or the cover 28 may be attached to the tank 22 in any conventional manner. The stainless steel flights 30 of the auger 26 extend helically toward the discharge end 38 of the blancher 20 such that when the auger 26 is rotated in a clockwise direction as shown in FIG. 3, the food product contained within the cylinder 34 is propelled by the auger flights 30 toward the discharge end 38.

Normally a rotating auger gently pushes a food product from the inlet to the outlet of the tank with very little side-to-side movement. However, in the blanching of some food products, for example, pasta, it is desirable to agitate individual food products in a nondestructive manner to insure the separation of the food products from one another. To contribute to this subtle agitation, the blancher 20 is preferably provided with lifting baffles 54 which extend approximately six inches inwardly from the screen of the perforated cylinder 34, and which each extend flight-to-flight between two adjacent flights 30 of the auger 26. Each planar baffle 54 is inclined away approximately 70° from the radial direction. In other words, each lifting baffle 54 is inclined approximately 20° above a plane tangent to the perforated cylinder 34 at the base of the baffle 54.

Figure 3:
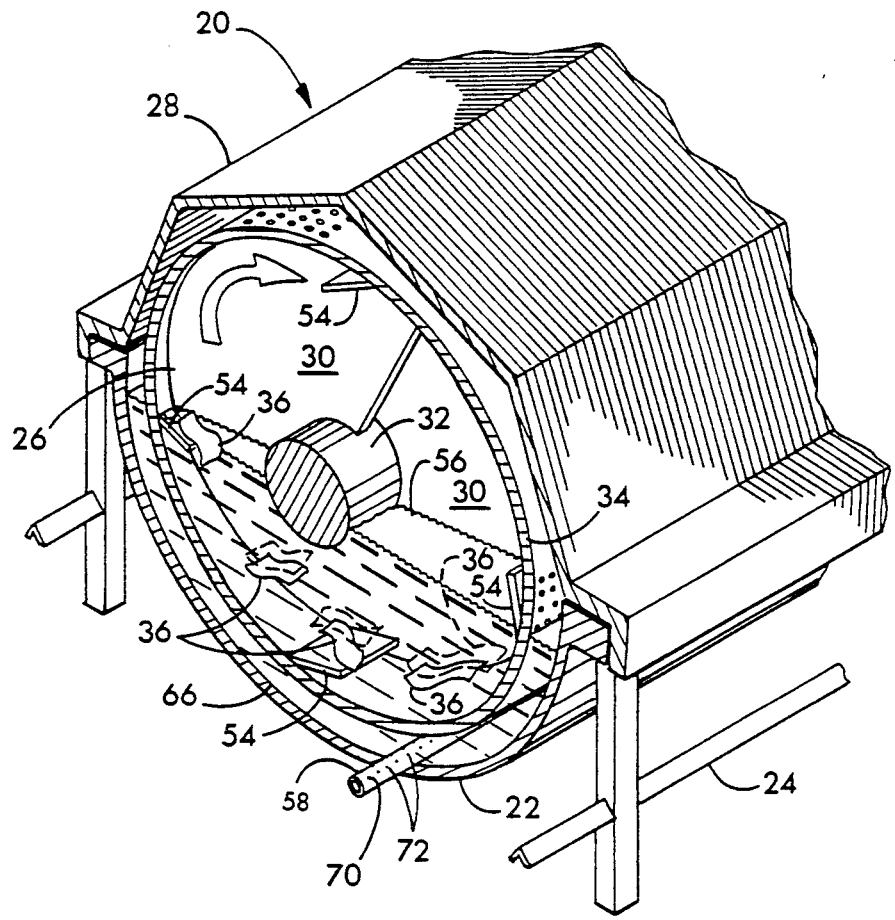
FIG. 3 is an isometric cross-sectional view of the blancher of FIG. 1 shown in operation with representative food product contained therein.
Figure 4:
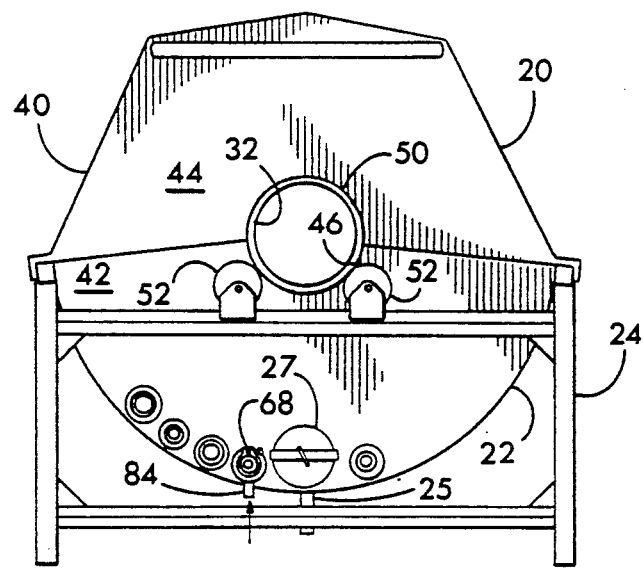
FIG. 4 is a front elevational view of the blancher of FIG. 1 showing the inlet end.

As best shown in FIG. 3, each lifting baffle 54 is adjacent to the perforated cylinder 34 at its leading edge as the cylinder rotates. Thus, each lifting baffle 54 gently scoops up food product 36 within the water 56 disposed within the tank 22 and conveys that food product 36 sidewardly across the width of the auger 26. As the baffles 54 leave the water 56 the inclination of the baffles becomes more nearly vertical allowing the conveyed food product 36 to slide off the baffle 54 without suffering damage. Each baffle 54 is separated 90° from its neighboring baffles.

Two combined steam and air manifolds 58, 60 are disposed within the tank 22 beneath the perforated cylinder 34. The inlet end manifold 60 extends through a manifold fitting 68 in the end wall 42 at the inlet end 40 of the tank 22 and is attached by brackets 64 to the cylindrical wall 66 of the tank 22. The inlet end manifold 60 is positioned parallel to the axis of the cylinder 34 at about 12.5° to the left side of a hypothetical vertical plane through the axis so as to be positioned beneath the ascending side of the cylinder 34. The discharge end manifold 58 extends through the end wall 42 at the discharge end 38 through a fitting 62 in the end wall 42 and is fixed to the cylindrical wall 66 of the tank 22 by brackets 64. The discharge end manifold 58 is located at approximately 12½° to the right of a hypothetical vertical plane extending through the axis of the cylinder 34 and is positioned beneath the descending side of the cylinder 34.

Figure 2:
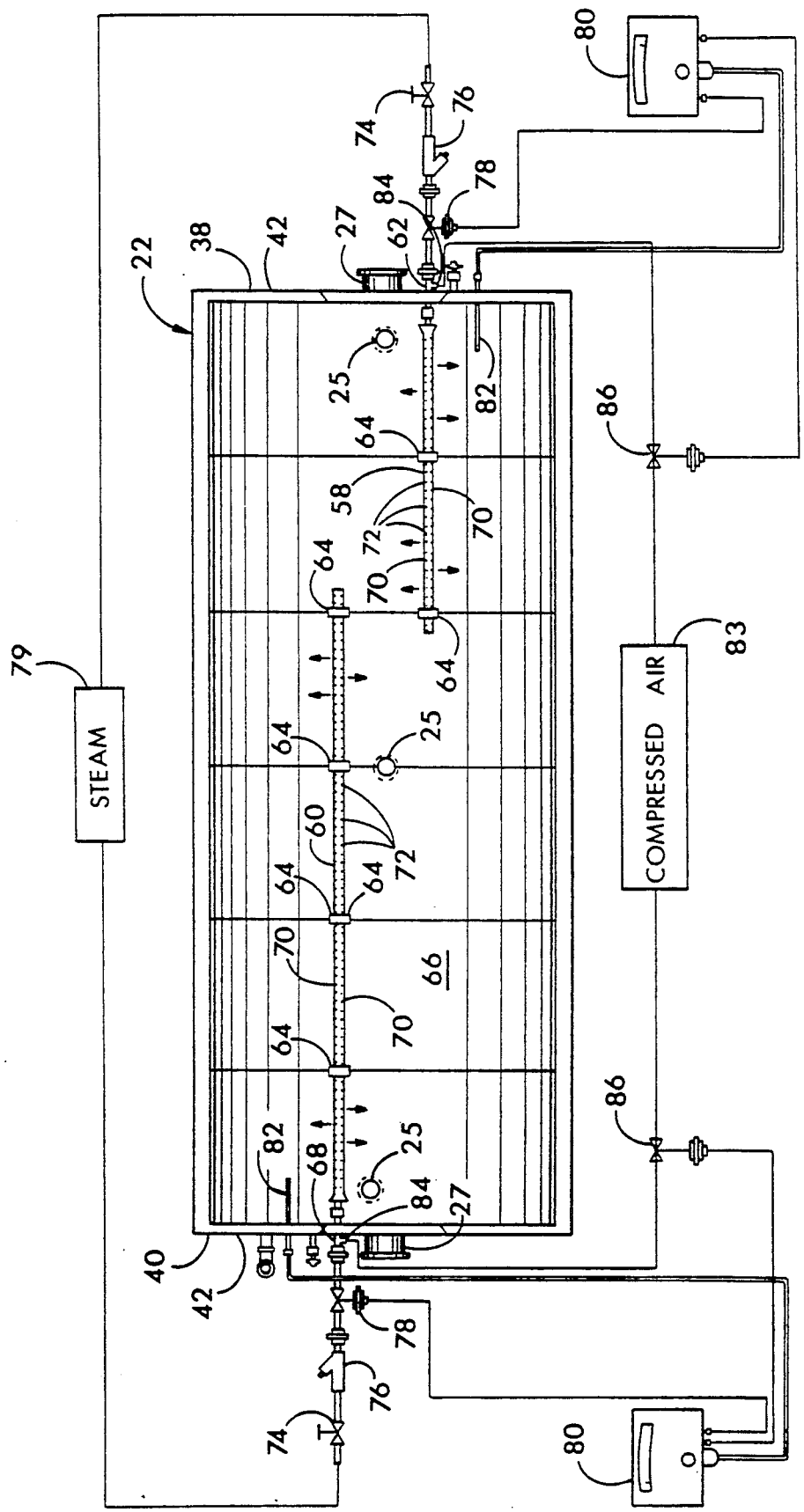
FIG. 2 is a top plan view of the blancher tank of FIG. 1 with cover removed with the air and steam supplies shown schematically.

As best shown in FIG. 2, the discharge end manifold 58 extends approximately one third of the length of the tank 22 along the tank cylindrical wall 66. The inlet end manifold 60 extends approximately two thirds of the tank length along the cylindrical wall 66.

Each manifold 58, 60 is a cylindrical pipe, 1¼" in diameter, which has two rows 70 of apertures 72 which run the length of the manifold. Each row 70 of apertures 72 is approximately 45° off from a radial plane extending through the center of the manifold. The apertures 72 permit the escape of gases from the manifolds into the water 56 contained within the tank 22. A supply of pressurized steam 79 is connected to each manifold 58, 60 and hand-operated shut-off valves 74 and steam strainers 76 are also provided. The steam pressure is typically from 25 psi to above 125 psi. An electrically controlled steam valve 78 such as the Taylor Hi-Flow ⅜" steam Valve No. 2003VA32231H is interposed between the supply of pressurized steam in each manifold. The steam valve 78 is electronically connected to a controller 80 which may automatically or manually control the introduction of steam into a manifold. A thermocouple 82 extends into each end wall 42 of the tank 22 and is electronically connected to a controller 80. The thermocouples 82 allow the temperature of the water 56 within the tank 22 to be monitored either manually or automatically to allow the controller to admit steam through the manifolds 58, 60 by opening the steam valve 78 to achieve the desired blanching temperature.

Particularly advantageous handling of the food product 36 is achieved in the blancher 20 by providing a source of compressed air at 10 PSI–100 PSI which is connected to the air fitting 84. Air valves 86 are placed in the compressed air lines between the compressed air supply 83 and the air fittings 84.

It has long been known to heat the water contained within a blancher tank by the injection of steam through one or more steam manifolds. It has been discovered that when compressed air is injected into the tank along with the steam, it results in a violent agitation of the water 56 which lifts the food products 36 and contributes to maintaining separation of individual food products.

As shown in FIG. 3, the placement of the manifolds 58, 60 below the cylinder 34 results in the regions of violent agitation extending into the perforated cylinder 34 and lifting the food products 36 where they are effectively engaged by the lifting baffles 54 of the rotating cylinder 34.

Although the steam and air supplies for each manifold 58, 60 have been illustrated as being controlled by separate controllers 80, a single controller may be provided for both manifolds.

Each manifold may be controlled to independently inject steam and air into the tank 22. Under certain blanching conditions it is necessary only to inject steam and air through the inlet side manifold 58, leaving the discharge end manifold steam and air valves 78, 86 closed throughout the blanching process.

As a general matter, the need for air agitation is lessened as the food product progresses from the inlet end to the discharge end of the tank 22. That is to say, as the food product is treated by the elevated temperatures within the tank it looses its tendency to stick to other food products. In such cases it may be practical to omit air injection at the discharge end.

Not only does the addition of compressed air create strong turbulence within the tank 22, but by adding air, a desired period of turbulence may be created with the addition of less steam than would be required to produce the same turbulence entirely by the introduction of steam. As too much steam introduced into the tank will overheat and hence over cook the food products 36, the admission of compressed air allows agitation for a greater period of time without overheating.

It should be noted that in some cases it may be desirable to intermittently introduce air through the manifolds 58, 60 while keeping the steam valves 78 closed to achieve turbulence without any increase in temperature. It should also be noted that the length of the inlet manifolds may be adjusted to suit particular blanching conditions.

It should also be noted that in operation the blancher 20 would be provided with conventional apparatus for loading and unloading food product therefrom.

It is understood that the present invention is not limited to the particular embodiments disclosed and illustrated herein, but embraces all such modified forms thereof as come within the scope of the following claims.

I claim:

1. A blancher comprising:
   a) a tank having an inlet end and a discharge end;
   b) a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom;
   c) an auger positioned substantially within the perforated cylinder to rotate with the cylinder, the auger adapted to drive the food product from the inlet end towards the cylinder discharge opening;
   d) an axially extending manifold disposed within the tank beneath the perforated cylinder, and having portions defining a plurality of apertures for the escape of gases from the manifold;
   e) a supply of steam connected to the manifold to permit the selective introduction of steam into the tank; and
   f) a supply of pressurized air connected to the manifold to permit the selective introduction of pressurized air into the tank wherein the air introduced thereby will impinge upon the food products carried within the cylinder.

2. The blancher of claim 1 further comprising a plurality of lifting baffles, each of which extends substantially radially inwardly from the perforated cylinder and between two adjacent flights of the auger, so that When the auger and cylinder rotate, the baffles carry the food product sidewardly and lift the food product upwardly out of the water, and then allow the food product to tumble back into the water.

3. The blancher of claim 1 wherein a first manifold extends into the tank from the inlet end of the tank and a second manifold extends into the tank from the discharge end of the tank.

4. The blancher of claim 1 wherein the manifold apertures form two rows in the manifold for the escape of gases therethrough.

5. The blancher of claim 1 wherein the manifold comprises a cylindrical pipe affixed to the tank at an angle of approximately 12½° from a vertical plane extending through the axis of the cylinder.

6. The blancher of claim 1 further comprising:
   a) a steam valve located between the steam supply and the manifold;
   b) a compressed air valve located between the compressed air supply and the manifold;
   c) a thermocouple extending into the tank; and
   d) an electronic controller electrically connected to the steam valve, the compressed air valve and the thermocouple, the controller being adapted to open and close the steam valve and the compressed air valve to selectively introduce steam and air into the tank to control the temperature of the tank contents.

7. A blancher comprising:
   a) a tank adapted to contain water therein;
   b) a perforated cylinder rotatably mounted within the tank, the cylinder having openings to allow food products to be introduced into and removed from the cylinder;
   c) an auger positioned within the perforated cylinder and having helical flights adapted to advance food product along the length of the tank;
   d) a tube having portions defining a plurality of upwardly opening apertures, the tube being connected within the tank such that the apertures are beneath the cylinder, and wherein the tube extends outside the tank;
   e) a supply of steam connected to the tube;
   f) a supply of compressed air connected to the tube;
   g) valves located between the steam and air supplies and the tube; and
   h) a controller connected to the valves to selectively control the introduction of steam and compressed air into the water contained within the tank to heat and agitate the food product contained within the tank.

8. The blancher of claim 7 further comprising a plurality of lifting baffles, each of which extends substantially radially inwardly from the perforated cylinder and between two adjacent flights of the auger, so that when the auger and cylinder rotate, the baffles carry the food product sidewardly and lift the food product upwardly out of the water, and then allow the food product to tumble back into the water.

9. The blancher of claim 7 wherein a first tube extends into the tank from an inlet end of the tank and a second tube extends into the tank from a discharge end of the tank opposite the inlet end.

10. The blancher of claim 7 wherein the tube apertures form two rows in the tube for the escape of steam and compressed air therethrough.

11. The blancher of claim 7 wherein the tube comprises a cylindrical pipe affixed to the tank at an angle of approximately 12½° from a vertical plane extending through the axis of the cylinder.

12. The blancher of claim 7 further comprising a thermocouple extending into the tank and wherein the controller is electrically connected to the valves and the thermocouple, the controller being adapted to open and close the valves to selectively introduce steam and air into the tank to control the temperature of the tank contents.

* * * * *